Figure 4:
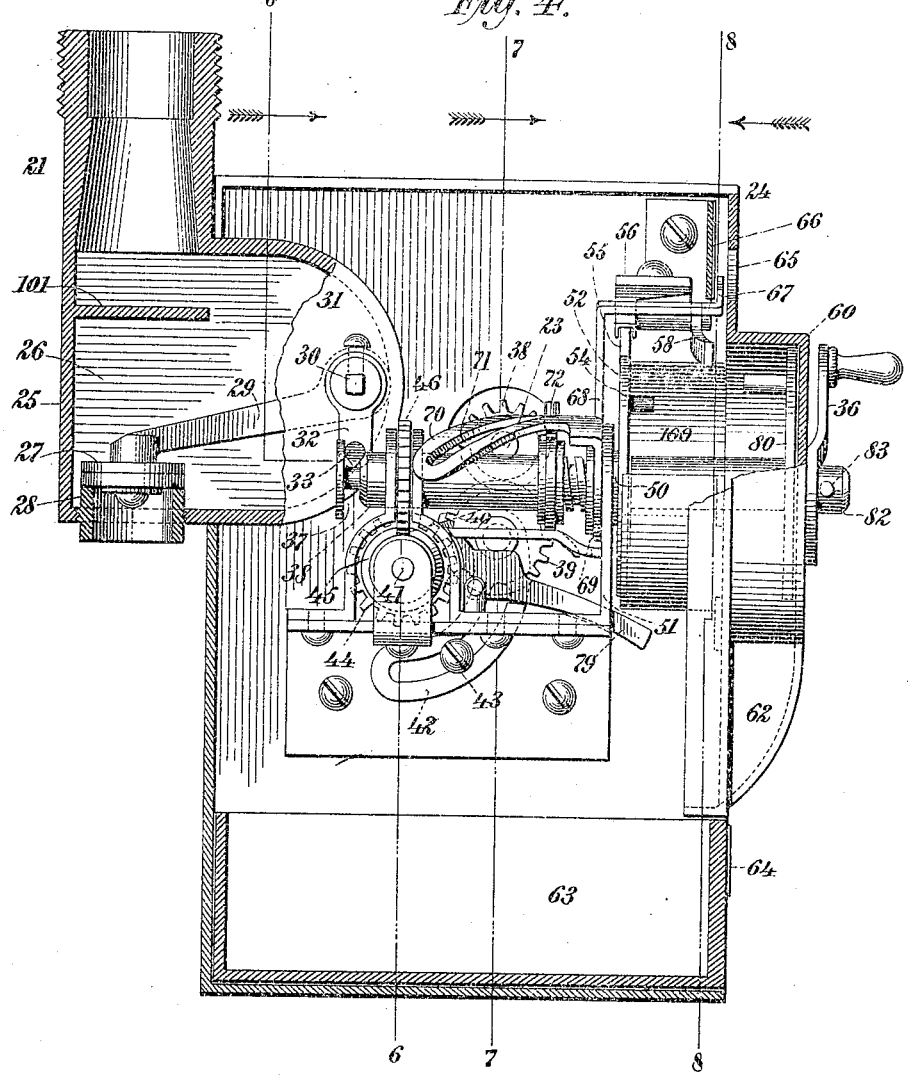

No. 871,290. PATENTED NOV. 19, 1907.
N. D. NELSON.
PREPAYMENT GAS METER.
APPLICATION FILED JULY 27, 1906.
4 SHEETS—SHEET 1.
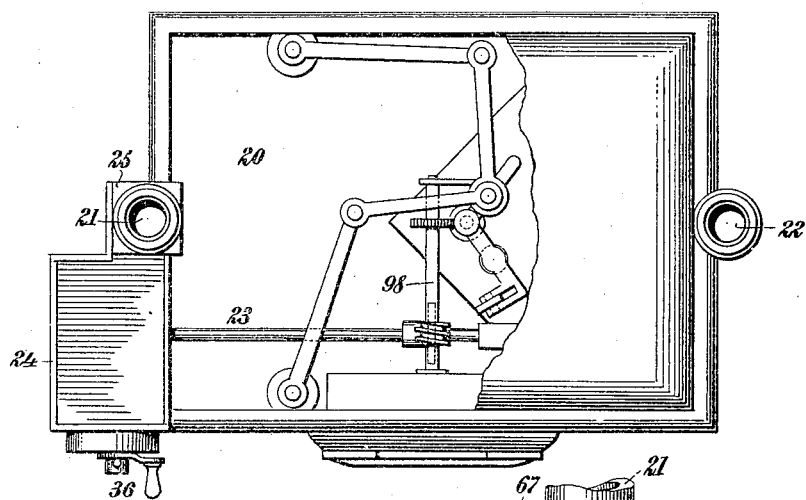
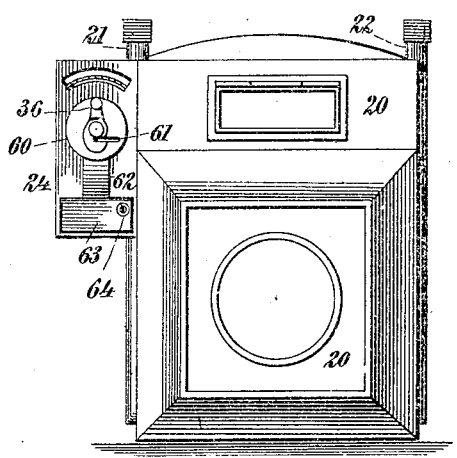
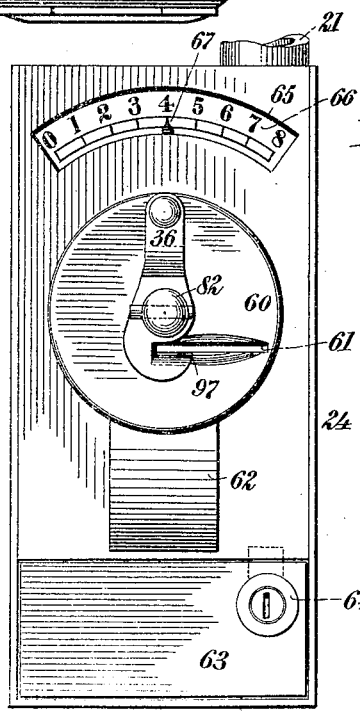
WITNESSES:
INVENTOR
Nils D. Nelson
BY
ATTORNEY No. 871,290.

PATENTED NOV. 19, 1907.

N. D. NELSON.
PREPAYMENT GAS METER.
APPLICATION FILED JULY 27, 1906.

4 SHEETS—SHEET 2.

WITNESSES:
Gustave Dieterich
Edwin H. Dieterich

INVENTOR
Nils D. Nelson
BY Chas. E. Gill
ATTORNEY

No. 871,290. PATENTED NOV. 19, 1907.
N. D. NELSON.
PREPAYMENT GAS METER.
APPLICATION FILED JULY 27, 1906.
4 SHEETS—SHEET 3.
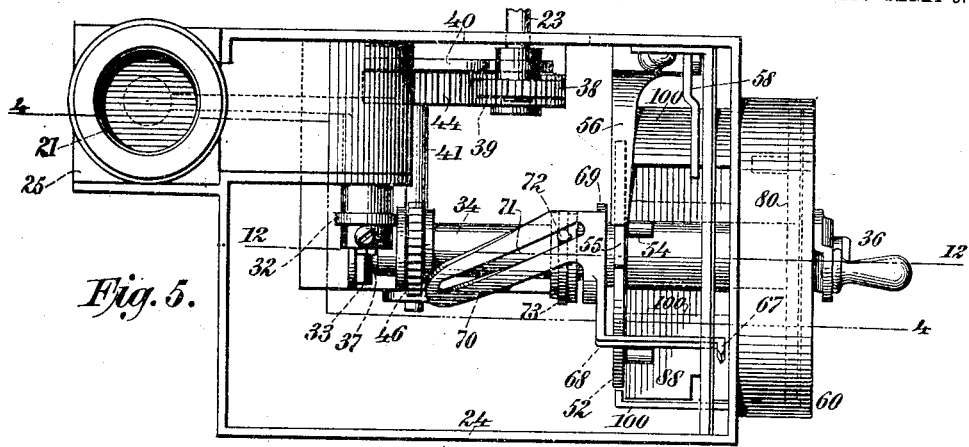
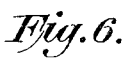
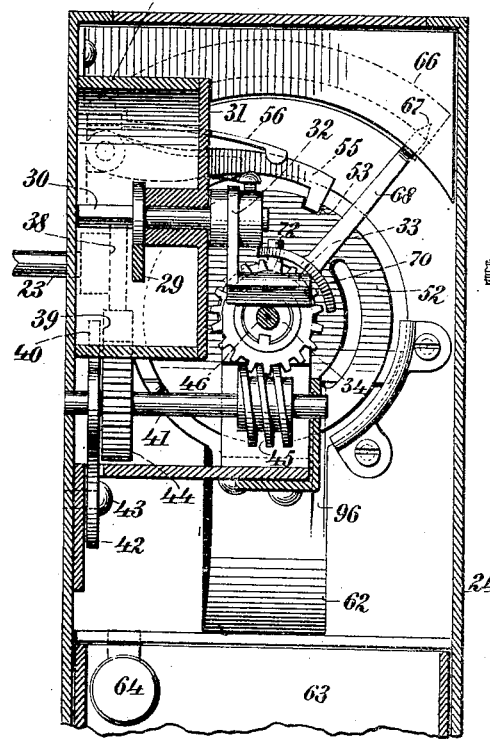
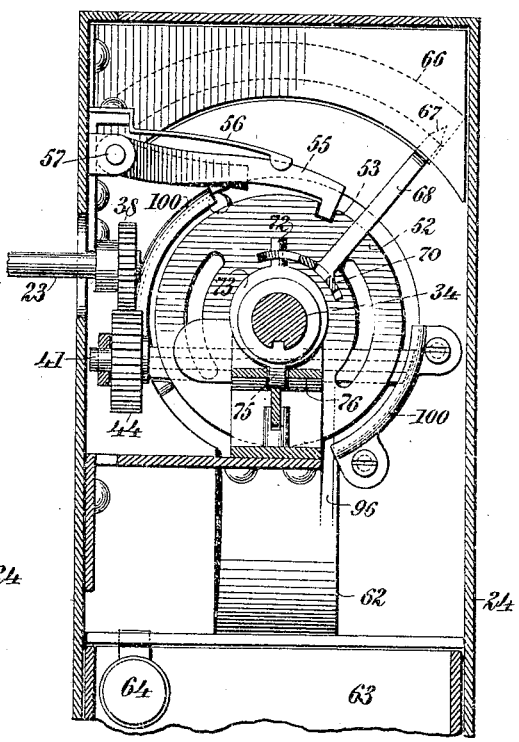
WITNESSES:
Gustave Dieterich
Edwin F. Dieterich
INVENTOR
Nils D. Nelson
BY Chas. C. Gill
ATTORNEY No. 871,290. PATENTED NOV. 19, 1907.
N. D. NELSON.
PREPAYMENT GAS METER.
APPLICATION FILED JULY 27, 1906.

4 SHEETS—SHEET 4.

WITNESSES:
Gustave Dieterich
Edwin W. Dieterich

INVENTOR
Nils D. Nelson
BY Chas. C. Gill
ATTORNEY

UNITED STATES PATENT OFFICE.

NILS D. NELSON, OF NEW YORK, N. Y.

PREPAYMENT GAS-METER.

No. 871,290.  Specification of Letters Patent.  Patented Nov. 19, 1907.

Application filed July 27, 1906. Serial No. 327,990.

*To all whom it may concern:*

Be it known that I, NILS D. NELSON, a subject of Great Britain, and resident of New York city, in the county of New York and State of New York, have invented certain new and useful Improvements in Prepayment Gas-Meters, of which the following is a specification.

The invention relates to improvements in coin-controlled apparatus for gas-meters, and it consists in the novel features, arrangements and combinations of parts hereinafter described, and particularly pointed out in the claims.
The object of my invention is to provide a simple, durable, compact and reliable means to be applied to a meter to permit of the prepayment for the gas to be consumed, the meter equipped with the features constituting my invention being a coin-controlled gas-meter.

In carrying out my invention I confine the features of the coin-controlled valve-operating mechanism in a box or casing secured to the side of the gas meter between the inlet pipe thereto and the front edge of the meter and without extending said casing above the meter or disturbing the location of the usual inlet "cone" by which the meter is connected with the usual supply pipe leading thereto. I also provide the casing containing the coin-receiving and valve-operating mechanism with an index, visible upon the front of the casing, whereby the consumer may determine the quantity of gas he has purchased and thereafter at any time the quantity of gas which he may have left to his credit to be consumed. The coin-receiving and valve-operating mechanisms provided by me have been designed with the purpose of securing certainty in their operation, both for the benefit of the purchaser and the vender of the gas.

Figure 13:
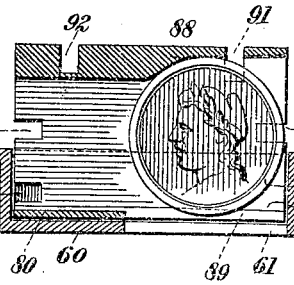
Figure 8:
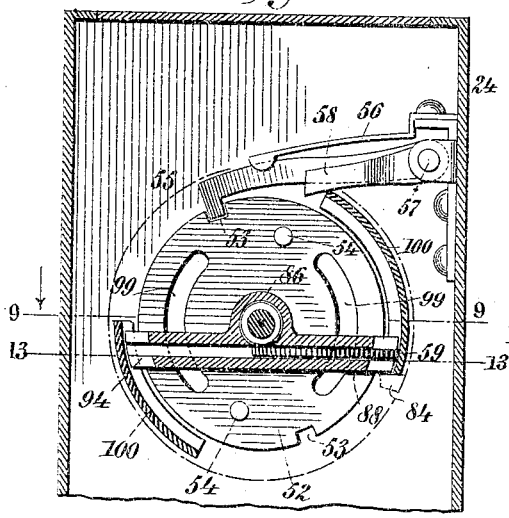
Figure 10:
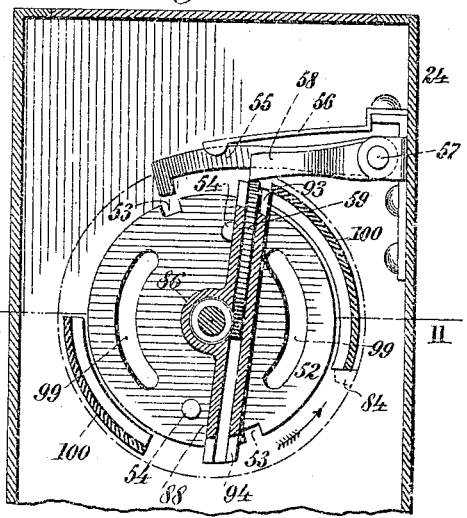
Figure 9:
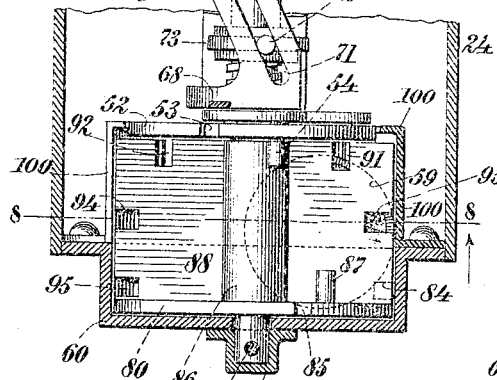
Figure 11:
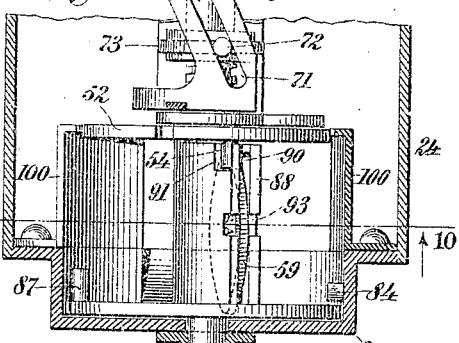
Figure 12:
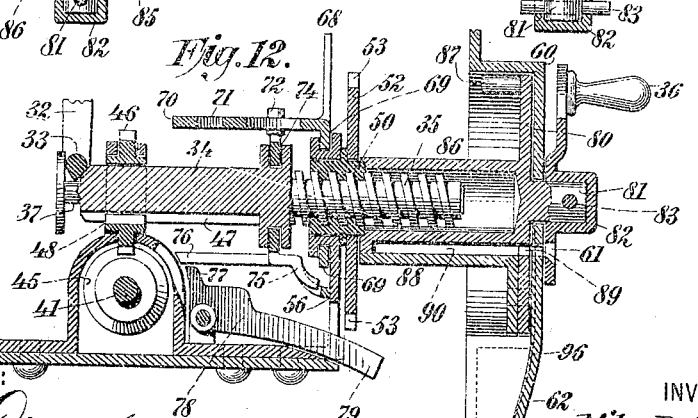

The invention will be fully understood from the detailed description hereinafter presented, reference being had to the accompanying drawings, in which:

Figure 1 is a front elevation of a gas meter of usual construction equipped with a coin controlled mechanism constructed in accordance with and embodying my invention; Fig. 2 is a top plan view of same, a portion of the cover of the meter being broken away to illustrate the usual meter index-mechanism, the details of which form no part of my present invention; Fig. 3 is an enlarged detached front elevation of the casing containing the coin-controlled mechanism embodying my invention; Fig. 4 is an enlarged vertical longitudinal section of same, the section being on the dotted line 4—4 of Fig. 5; Fig. 5 is a top view of same, the cover of the inclosing casing being omitted so as to disclose the interior mechanism, Fig. 6 is a vertical transverse section of same on the dotted line 6—6 of Fig. 4; Fig. 7 is a vertical transverse section of same on the dotted line 7—7 of Fig. 4; Fig. 8 is a vertical transverse section through a portion of same on the dotted line 8—8 of Figs. 4 and 9; Fig. 9 is a detached horizontal section of a portion of same on the dotted line 9—9 of Fig. 8; Fig. 10 is a vertical section of a portion of same on the dotted line 10—10 of Fig. 11; Fig. 11 is a horizontal section through a portion of same on the dotted line 11—11 of Fig. 10; Fig. 12 is an enlarged vertical longitudinal section of a portion of the coin-controlled mechanism taken on a central line through the same, and Fig. 13 is a horizontal section of same on the dotted line 13—13 of Fig. 8.

In the drawings, 20 designates a meter of any usual or suitable construction having a customary inlet pipe 21 and a usual outlet pipe 22, whence the gas after passing through the meter and suitably actuating the customary mechanism therein escapes to the service pipes leading to the burners.

In Fig. 2 I illustrate a portion of well known meter mechanism operated by the passage of the gas through the meter to effect the usual indexing, and this mechanism requires no special description, being well known and my invention having nothing to do therewith, with the exception that the usual shaft 23 actuated by said mechanism is utilized in connection with the features constituting my invention, all of which are inclosed within a box or casing 24 secured to the side of the front portion of the meter and facing frontwardly as shown in Figs. 1 and 2, the top of the box 24 being about on a line with the top of the meter and the front of said box being about flush with the front of the meter, and said box 24 being intermediate the inlet pipe 21 and the front of the meter, which is a very desirable and convenient position for the box and in carrying out my invention I have so designed the parts of same that their inclosing box may be given the location with respect to the meter indicated in Figs. 1 and 2.

The box 24 has at its rear end a box-like section 25 (Fig. 4) interposed in the inlet pipe 21, and within this section 25 is formed a chamber 26 containing the control-valve 27 for the entrance of gas to the meter, this valve 27 being adapted to the upper edge of a valve-seat 28 and being supported by a crank arm 29 secured upon a rock shaft 30 having an end projecting through the side 31 of the section 25 into the interior of the box 24, upon which end is secured a crank arm 32 by which the valve 27 is operated to open or move upwardly. The crank arm 32 is formed with a laterally projecting arm or finger 33 which is engaged by a stem 34 (Fig. 12) of a spirally threaded longitudinally disposed worm 35 adapted to be moved inwardly or toward the rear (without rotating) from the crank handle 36 upon the introduction of a proper coin to the mechanism and in a reverse or outwardly direction toward the front (while rotating) from the meter-actuating-shaft 23, the movement of the worm 35 inwardly by means of the handle 36 operating to open the valve 27 and the movement of said worm reversely or toward the front permitting said valve 27 to close. The stem 34 is rigid with the worm 35 and has a plain cylindrical surface of considerable length, as shown in Figs. 4, 5 and 12, and at its outer or rear end is formed with an annular groove 37 into which the arm 33 connected with the crank mechanism for operating the valve 27, may pass to permit the valve 27 to seat and close the passage through the inlet pipe 21.

The meter operating-rod or shaft 23 enters the box 24 and is provided therein with a gear wheel 38 (Figs. 4, 5 and 6) which is in mesh with a gear wheel 39 carried by an arm 40 swung from a shaft 41 and having a depending segmental slotted portion 42 (Fig. 4), whereby by means of a screw 43 said arm 40 may be secured in any necessary position to make a proper engagement of the gear wheel 39 with the gear wheel 38, in accordance with the size of the gear wheel 38. The gear wheel 39 is in constant mesh with a gear wheel 44 secured upon the said shaft 41, which extends transversely of the box 24 and is provided below the stem 34 with a worm 45 (Fig. 6) in mesh with a gear wheel 46 keyed to said stem, said stem having a longitudinal groove 47 (Fig. 12) and said gear wheel 46 a key 48 within the same, whereby the said gear wheel may impart rotary motion to the stem 34 and worm 35 and permit said stem to travel through the same. The movement of the stem 34 controls the operation of the valve 27, and said stem during the gas consumption is moved forwardly or toward the front through the chain of gearing just above described comprising the meter operating-rod 23, gear wheels 38, 39, 44, shaft 41, worm 45 and gear wheel 46.

The worm 35 has upon it a nut 50 (Fig. 12) held by a bracket 51 and having secured upon it a disk 52, which is only rotated when a proper coin has been introduced to the machine and the handle 36 is operated to open the valve 27. The outward movement, toward the front, of the stem 34 results in the worm 35 rotating within the nut 50 without actuating the same or any part connected therewith, and this movement of said stem and worm is always while the same are in rotation. The inward movement of the stem 34 and worm 35, for opening the valve 27, is direct and without said stem and worm being rotated, this direct movement of said stem and worm being effected by imparting rotary motion to the disk 52 and nut 50.

The disk 52 is a plain flat plate having at opposite points in its periphery recesses 53 (Fig. 8), and on its front face pins 54, and said disk remains stationary except when it is rotated from the crank handle 36 after a coin has been introduced into the machine. The disk 52 is held against rotation, except when actuated from the handle 36, by means of a dog 55 whose engaging end enters the recess 53 which may at the time be at the upper edge of the disk. The dog 55 is pressed against the disk 52 by means of a spring 56 and is secured upon a rock shaft 57 carrying a crank arm 58, which upon the application of a proper coin to the machine and the actuation of same by the coin holding mechanism, is elevated by the contact therewith of the coin, lettered 59 in Fig. 10, for the purpose of turning the shaft 57 and elevating the dog 55 from contact with the disk 52, so that the latter by the contact of the same coin with one of the pins 54 may be compelled to rotate and impart its motion to the nut 50, for driving the worm 35 and its stem 34 inwardly to open the valve 27.

In the front of the casing 24 is a circular forwardly projecting section 60 containing the coin slot 61 at one side of the center thereof and opening at its lower side into a vertical inwardly inclined chute 62, down through which the coins fall into a drawer or coin receptacle 63 (Fig. 3), provided with a suitable lock 64. In the front of the casing 24 above the circular section 60 is formed a segmental slot 65 exposing a scale 66 bearing a series of numerals for coöperation with an index hand 67, said scale and hand denoting the position of the valve 27 and moving toward the left as the gas is consumed. The hand 67 moves toward the right during the operation of the mechanism, with the proper coins, to open the valve 27. The index hand 67 is formed on the front end of a bent arm 68 (Fig. 5) integral with a plate 69 set into a groove in that portion of the bracket 51 which encompasses and serves as a bearing for the nut 50, as shown in Fig. 12. The plate 69 is formed with a rearwardly projecting oblique cam-arm 70 (Fig. 5) containing a slot 71 which receives a pin 72 carried by a vertical plate or disk 73 mounted in an annular groove 74 (Fig. 12) formed in the front end of the stem 34, said disk 73 being free in the groove 74 so that said stem may rotate without rotating said disk. The disk 73 moves directly rearwardly and frontwardly and carries the pin 72 along the cam slot 71, which being oblique necessitates the movement of the cam plate 70 to follow the pin 72. The cam 70 during the travel of the stem 34 performs an axial movement and compels a like movement in the disk 69, arm 68 and index finger 67, causing the latter to travel along the scale 66 provided in the front of the casing 24, whereby the index finger 67 is compelled to move correspondingly with the movement of the stem 34, whether the latter is moving inwardly due to the rotation of the crank handle 36 or outwardly due to the consumption of the gas.

At the lower edge of the disk 73 is formed a downwardly extending finger 75 which guides in a slotted plate 76 to prevent the disk 73 from having any rotary motion and also serves when the full capacity of the coin controlled mechanism has been reached, to move inwardly against the arm 77 (Fig. 12) of a latch 78 and turn the arm 79 of said latch upwardly into one of the recesses 53 of the disk 52, thereby locking said disk against rotation. The construction presented admits of eight coins, say, eight quarters, being introduced, one after another, into the mechanism for purchasing two dollars worth of gas at one time, and after the last one of the eight quarters has been thus introduced and the mechanism operated thereby, the finger 75 will have reached the inner end of its line of travel and thrown the latch arm 79 upwardly into the recess 53 of the disk 52, thereby locking the apparatus against further operation and also, in the manner hereinafter described, locking the coin receiving devices against operation with the coin slot 61 closed, so that no further coins may in that condition of the apparatus be introduced through said slot.

The coin receiving means comprise a disk 80 which fits within the forwardly projecting section 60 of the casing 24 and is close against the inner face thereof, as shown in Figs. 9, 11, 12, and this disk 80 carries upon its front face a pin 81 which enters the hub 82 of the crank handle 36, the said hub 82 being secured to said pin 81 by means of a pin 83 or other suitable means. The side of the section 60 is provided with a stud 84 (Fig. 11) which serves as a stop and also as means for keeping the disk 80 close against the inner front wall of the section 60. The disk 80 is formed in its edge with a recess 85 which permits said disk to pass by the stud 84, this recess 85 being necessary, because the edges of the disk 80 snugly fit within the circular edges of the section 60.

At its inner face the plate 80 is formed with a hollow cylindrical hub or sleeve 86 which extends inwardly to and bears upon the front edges of the nut 50 and receives within it and forms a housing for the worm 35. Upon the inner face of the plate 80 and near one edge thereof is secured a stop-pin 87 (Figs. 9, 11, 12), and also at one side of the sleeve 86 is provided a coin holding frame 88 formed of two parallel plates properly separated to receive between them a proper coin 59, as shown in Figs. 10 and 11, the frame 88 being closed at its outer or front edge with the exception of a sufficient portion at the side of one end thereof to match the coin slot 61, there being an opening 89 (Fig. 12) in the disk 80, corresponding with the coin-slot 61 leading into the space numbered 90 (Fig. 12) in the frame 88, so that a coin introduced to the coin slot 61 and opening 89 may reach the frame 88 and be held therein at one end of the space 90, where the coin is utilized to actuate the mechanism of the device in the manner hereinafter described and then permitted to escape (when the coin-receiving end of the space 90 attains a vertical position) down through the chute 62. At one end of the frame 88 the space 90 is wider than at the other end thereof, as shown in Fig. 13, this being due to the fact that the inner wall closing the rear end of the space 90 varies in width, as at 91. If a coin less than the proper size were introduced into the frame 88 it would not be held at one end of said frame in the manner shown in Figs. 8, 10 and 13 but would slip through said frame upon the turning of the latter from its horizontal position (which is the introductory position for the coin, as shown in Fig. 12) without operating any of the mechanism. The inner or rear edge of the frame 88 is formed near one end with a recess 91 (Fig. 9) to permit of a limited exposure of the edge of the coin 59 so that it may contact, when the crank handle 36 and plate 80 are operated, with one of the pins 54 on the disk 52, for the purpose of rotating said disk, and the said inner edge of the frame 88 near its other end is formed with a recess 92 so that during the rotation of the frame 88 from the crank handle 36 said frame may pass by the other pin 54 on the disk 52 without touching the same.

At the receiving end of the frame 88 there is provided in the outer edge of said frame a recess 93, which, as shown in Figs. 9 and 11, permits the exposure of a portion of the coin 59, so that during the rotation of the frame 88 the coin before reaching the pin 54 on the disk 52 to rotate the latter, may be carried against the crank arm 58 and elevate the dog 55 from said disk 52, thus freeing the disk 52 so that it may be rotated by the pressure of the coin against the pin 54. At the opposite end of the frame 88 (Fig. 9) is formed a recess 94, so that during the rotation of the frame 88 said recess 94 may pass along by the crank arm 58 without touching the same. When the frame 88 is rotated without a proper coin being therein the recess 93 will also pass by said crank arm 58 and allow the latter to remain at rest, whereby the dog 55 maintains the disk 52 in a locked position and the worm 35 is held at rest. In order to impart motion from the crank handle 36 to the disk 52 and through said disk and its nut 50 to the worm 35, a proper coin must be introduced into the frame 88, since the coin is utilized first to free the dog 55 from the disk 52 and then to effect the rotation of said disk with its nut 50, the rotation of the latter causing the worm 35 to have a direct inward movement. Adjacent to the front edge of the frame 88 the end thereof which does not initially receive the coins is formed with a recess 95 (Fig. 9), which permits said frame 88 to rotate by the stop pin 84 fixed in the circular frame section 60, while at the receiving end of the frame 88 no such recess is provided, it being intended that the receiving end of the frame 88 shall strike against the stop 84 and become arrested thereby when said frame is in a horizontal position in line with the coin receiving slot 61. After the coin has been introduced into the frame 88 the crank handle 36 is moved downwardly toward the left, looking at Fig. 3, so as to carry the coin upwardly against the crank arm 58 and then against a pin 54 of the disk 52, and this movement is continued until the receiving end of the frame 88 has performed about three-quarters of a rotation and said end stands vertically adjacent to the left hand edge, looking at Fig. 3, of the chute 62, at which time the coin will fall from said frame and pass downwardly along said chute into the cash receptacle 63. When the frame 88 thus attains its vertical discharge position, the pin 87 on the disk 80 will contact with the stop 84 and arrest said disk and said frame 88. When the coin 59 is in the receiving end of the frame 88 and the latter is being rotated, said coin is held between the rear wall 91 of the frame 88 and the inner face of the front section 60 of the casing, a portion of the edge of the coin remaining in the slot 89 in the disk 80, so that said coin may not lose its position. I therefore form in the inner wall of the front section 60 a vertical groove 96 in line with the coin when the latter reaches its discharge position, so that the coin may readily escape downwardly into the chute 60, the opening 89 in the plate or disk 80 extending to the outer edge of said disk and passing into line with said groove 96 when the frame 88 attains its discharging position. When the admission slot 89 of the disk 80 passes from the coin slot 51 the face of said disk closes said slot 61.

The crank handle 36 is rigid with the disk 80 and I provide said handle, as shown in Fig. 3, with a knife edge 97, so that in the event that a person should introduce a coin tied to a string or the like through the slot 61, the movement of the plate or disk 80 by means of the handle 36 would result in the string or the like being severed by the knife 97. The slot 89 in the disk 80 when moving upwardly from the admission slot 61, and due to the fact that said slot 89 is below the center of said disk carries its outer end upwardly first from the slot 61, thus causing any string or wire which might be connected with a coin, to slide along the slot 61 toward the inner end of same in position for the knife 97 to perform its function.

The disk 52 is formed with slots 99 through which an instrument could pass should one be inserted through the coin slot 61 for the purpose of operating the internal mechanism without the use of a coin.

Within the casing 24 I provide segmental plates 100 which are in line with the circular front section 60 of said casing and form walls within which the inner portions of the outer edges of the frame 88 may rotate during the operation of the machine, the inner edges of said frames 100 being flanged inwardly as shown in Fig. 9 to encompass the disk 52. The upper edge of the right hand segmental plate 100 (Fig. 4) serves as a stop for the crank arm 58 (Fig. 8) when the dog 55 is in engagement with one of the recesses 53 of the disk 52.

Within the rear casing section 25 I provide above the valve 27 a shelf 101 to prevent any sediment settling upon the valve or its seat.

In the initial condition of the mechanism constituting my invention, the parts will be in the relative positions shown in Fig. 4, the valve 27 being closed, the crank handle 36 being in a vertical position, the index finger 67 being at the cipher on the scale 66 and the coin receiving frame 88 being in a horizontal position with the entrance opening 89 thereto in line with the coin receiving slot 61, as shown in Fig. 12. When the parts are in the position just stated the worm 35 and its stem 34 are in their extreme forward position and the arm 33 connected with the valve operating arms is in the annular groove 37 at the outer end of said stem. When the valve 27 is in its closed position no gas is allowed to enter the meter. The consumer desiring to purchase gas will insert the proper coin, a silver quarter, for illustration, through the coin slot 61 and into the space 90 of the frame 88, to the position indicated by dotted lines in Fig. 9 and solid lines in Figs. 8 and 13, and thereupon the consumer will rotate the crank handle 36 from the position shown in Fig. 3 downwardly toward the left until the said handle completes a three-quarter turn, when the frame 88 will attain a vertical position in line with the left hand edge of the chute 62, looking at the front of the meter, and the coin escapes downwardly to the cash box 63. The rotation of the frame 88 with the coin 59 therein results in said coin being carried upwardly and around toward the left, as shown in Fig. 10, said coin at the exposure recess 93 in the frame 88 first acting against the crank arm 58 to free the dog 55 from the disk 52 and then at the exposure recess 91 in said frame engaging a pin 54 on said disk 52 and effecting during the continued movement of said frame the rotation of said disk, said disk with each operation of the frame 88 while holding a coin making about one-half of a rotation. The rotation of the disk 52, by means of the coin, results in the nut 50 having a corresponding rotation and driving the worm 35 and stem 34 inwardly toward the rear, whereby the beveled inner end edges of said stem are pressed against the beveled edges of the arm 33 and the valve 27 is forced to an open position. If the purchaser only desires the twenty-five cents worth of gas he will pay no further attention to the apparatus. The valve 27 having been opened the gas will flow through the inlet 21 to the meter and thence to the outlet 22, and during its consumption it will through the usual two-foot meter shaft 98, shaft 23, gear wheels 38, 39, 44, shaft 41, worm 45 and gear wheel 46, gradually rotate the stem 34 and worm 35, and at such time the nut 50 gradually moves said worm 35 toward its initial or extreme forward position. The inward or rearward movement of the stem 34 having acted through the crank arm 32 and arm 29 to open the valve 27, the outward or frontward movement of said stem will result in the closing of the valve 27.

The rotation of the nut 50 by means of the disk 52 effects the inward or rearward movement of the stem 34 and worm 35, and the rotation of the worm 35 within the nut 50 when the latter is stationary compels the frontward movement of said worm and stem. When the consumer placed the coin in the frame 88 and operated the worm 35 to open the valve 27, the movement of the stem 34 inwardly resulted in the disk 73 and pin 72 being carried inwardly to a slight extent and in said pin acting on the cam plate 70 to turn the index finger 67 from the cipher to the numeral "1" on the scale 66. During the outward movement of the worm 35 and stem 34 during the consumption of the gas the pin 72 moves outwardly with said stem and through the cam 70 reverses the movement of the index finger 67, in the illustration referred to returning said finger to the cipher on the scale 66.

I have constructed the present apparatus to receive eight successive coins or to sell two dollars' worth of gas when so desired, and in such employment of the apparatus the purchaser will insert one coin in the manner heretofore described and operate the handle 36, and thereupon he will return the handle to its initial position moving it downwardly toward the left and then upwardly to the position shown in Fig. 3, and then successively introduce the further coins and operate the said handle in the same manner that he did upon the introduction of the first coin. Each successive operation of the handle 36 will result in the worm 35 and stem 34 moving inwardly or toward the rear, and after the eighth coin has been introduced and the handle 36 operated for the eighth time, the full capacity of the present mechanism will have been reached and the worm 35 and stem 34 will be at their extreme inward or rearward position, and upon attaining this position the finger 75 connected with the disk 73 will have moved against the finger 77 of the latch 78 and moved the arm 79 of said latch into the then lower recess 53 of the disk 52, thereby locking the said disk against rotation; and at this time the front end of this arm 79, being then elevated, will stand in the path of the frame 88, thereby preventing the latter from being returned to its initial position and enabling the disk 80 to maintain the coin admission slot closed. During the inward motion of the stem 54, upon the successive operations of the handle 36, the pin 72 acting against the cam 70 gradually moves the index finger 67 until it reaches the numeral "8" on the scale 66. After the stem 34 has moved inwardly to a slight extent the annular groove 37 at the inner end of said stem will pass inwardly beyond the arm 33 of the valve operating arms and thereafter said arm 33 will simply ride upon the upper surface of said stem. When the upper surface of the stem 34 first passes under the arm 33 the valve 27 will have been opened to its full extent, and said valve will remain in such position during all of the time that the upper surface of said stem is moving under said arm both during the inward and outward movements of the said stem. During the consumption of the gas, two dollars' worth thus having been purchased, the worm 35 and stem 34 will be moved frontwardly, with the result that the index hand 67 will gradually return to its initial position, the finger 75 will leave the latch plate 78 and the arm 79 thereof drop from its engagement with the disk 52, and finally the outer end of the stem 34 will reach the arm 33 connected with the valve and said arm will enter the annular groove 37 of said stem and allow the valve 27 to close and cut off the flow of the gas to the meter.

The fact that the gear wheel 39 is mounted upon a radial arm 40 swung from the shaft 41 enables me to adjust said gear wheel upwardly or downwardly to effect the proper engagement of the same with the gear wheel 38 carried by the meter operating shaft 23, in accordance with the size of said gear wheel 38. When the gear wheel 39 has been adjusted to its proper position with respect to the gear wheel 38 it is secured by means of the slotted arm 42 and screw 43, as shown in Fig. 4. The gear wheel 39 is always in mesh with the gear wheel 44, but due to the varying prices of gas it may be necessary in order to adjust the entire apparatus in accordance with the price of gas and the value of the coin to be introduced for operating the apparatus, to vary the size of the wheel 38, and consequently to meet these conditions I mount the gear wheel 39 on the arm 40 and employ it as an intermediate gear between the gear wheel 38 and the gear wheel 44 which drives the shaft 41.

The features hereinbefore described and not permissible of being claimed herein, to-wit: the coin-controlling mechanism *per se*, will be made the subject of a separate application for Letters Patent.

What I claim as my invention and desire to secure by Letters-Patent, is:—

1. A meter, a valve for controlling the flow of gas through the same, a connected worm (35) and stem (34) adapted to have a longitudinal movement and to control the position of said valve, and said stem having a longitudinal groove 47, a gear-wheel 46 mounted on said stem and having a key 48 in said groove, a worm 45 in mesh with said gear wheel, mechanism operable by the passage of gas from the meter and connected with said worm 45 for rotating the same and said gear-wheel and connected worm and stem, a nut 50 engaging said worm 35 for compelling it and its stem 34 to travel longitudinally toward their initial position when they are thus rotated, means for holding said nut stationary while said connected worm and stem are traveling toward their initial position, and means for manually rotating said nut and thereby compelling the same to effect the direct reverse travel of said connected stem and worm without rotation for opening said valve; substantially as set forth.

2. A meter, a valve for controlling the flow of gas through the same, a connected worm and stem adapted to have a longitudinal movement and to control by its position the position of said valve, mechanism operable by the passage of gas from the meter and engaging said stem for rotating said stem and worm, a nut engaging said worm for compelling said stem and worm to travel longitudinally toward their initial position when they are thus rotated, means for manually rotating said nut and thereby compelling the same to effect the direct reverse travel of said stem and worm without rotation for opening said valve, and means actuated by the travel of said stem for locking said nut against rotation when the mechanism has been actuated to its predetermined capacity; substantially as set forth.

3. A meter, a valve for controlling the flow of gas through the same, a connected worm and stem adapted to have a longitudinal movement and to control by its position the position of said valve, mechanism operable by the passage of gas from the meter and engaging said stem for rotating said stem and worm, a nut engaging said worm for compelling said stem and worm to travel longitudinally toward their initial position when they are thus rotated, means for manually rotating said nut and thereby compelling the same to effect the direct reverse travel of said stem and worm without rotation for opening said valve, a pivoted latch, and a part carried by said stem for engaging said latch and moving it to a position to lock said nut against rotation when the mechanism has been actuated to its predetermined capacity; substantially as set forth.

4. A meter, a valve for controlling the flow of gas through the same, a connected worm and stem adapted to have a longitudinal movement and to control by its position the position of said valve, mechanism operable by the passage of gas from the meter and engaging said stem for rotating said stem and worm, a nut engaging said worm for compelling said stem and worm to travel longitudinally toward their initial position when they are thus rotated, means for manually rotating said nut and thereby compelling the same to effect the direct reverse travel of said stem and worm without rotation for opening said valve, an index on which the gas purchased is indicated, a hand for said index, a cam-plate connected with said hand for moving the same, and a pin carried by said stem in engagement with said cam for acting on the latter during the travel of said stem; substantially as set forth.

5. A meter, a valve for controlling the flow of gas through the same, a connected worm and stem adapted to have a longitudinal movement and to control by its position the position of said valve, mechanism operable by the passage of gas from the meter and engaging said stem for rotating said stem and worm, a nut engaging said worm for compelling said stem and worm to travel longitudinally toward their initial position when they are thus rotated, means for manually rotating said nut and thereby compelling the same to effect the direct reverse travel of said stem and worm without rotation for opening said valve, an index on which the gas purchased is indicated, a hand for said index, a cam plate connected with said hand for actuating the same and being mounted to turn on the arc of a circle and having an oblique slot, and a pin carried by said stem in said slot for acting against said cam during the travel of said stem; substantially as set forth.

6. A meter, a valve for controlling the flow of gas through the same, a rock-shaft carrying an arm upon which said valve is secured and having an actuating crank-arm, a worm and stem adapted to have a longitudinal movement and to control the position of said valve, mechanism operable by the passage of gas from the meter for rotating said stem and worm, a nut for compelling said stem and worm to travel longitudinally toward their initial position when they are thus rotated, said stem having a grooved end to receive the end of said crank-arm when said valve is closed and a uniform surface to ride below said crank-arm when said valve is open, and means for manually rotating said nut and thereby compelling the same to effect the reverse travel of said stem and worm for opening said valve; substantially as set forth.

7. A meter, a valve for controlling the flow of gas through the same, a rock-shaft carrying an arm upon which said valve is secured and having an actuating crank-arm, a worm and stem adapted to have a longitudinal movement and to control the position of said valve, mechanism operable by the passage of gas from the meter for rotating said stem and worm, a nut for compelling said stem and worm to travel longitudinally toward their initial position when they are thus rotated, said stem having a uniform surface to ride below said crank arm when said valve is open for maintaining it at a uniform open position, and means for effecting the reverse travel of said worm and stem for opening said valve; substantially as set forth.

8. A meter, a valve for controlling the flow of gas through the same, a rock shaft carrying an arm to which said valve is secured, and having an actuating crank arm, a worm and stem adapted to have a longitudinal movement and to control the position of said valve, mechanism coöperating with the passage of gas from the meter for effecting the travel of said worm and stem toward the initial position, said stem having a grooved end to receive the end of said crank arm when said valve is closed and a uniform surface to ride against said arm when said valve is open for maintaining it at the uniform open position, and means for manually effecting the reverse travel of said worm and stem for opening said valve; substantially as set forth.

9. A meter, a valve for controlling the flow of gas through the same, a worm and stem adapted to have a longitudinal movement to control the position of said valve, mechanism coöperating with the passage of gas from the meter for effecting the travel of said worm and stem toward the initial position, means for manually effecting the reverse travel of said worm and stem to open said valve, an index on which the gas purchased is indicated, a hand for said index, a cam plate connected with said hand for moving the same, and a pin carried by said stem in engagement with said cam for acting on the latter during the travel of said stem; substantially as set forth.

10. A meter, a valve for controlling the flow of gas through the same, a worm and stem adapted to have a longitudinal movement to control the position of said valve, mechanism coöperating with the passage of gas from the meter for effecting the travel of said worm and stem toward the initial position, means for manually effecting the reverse travel of said worm and stem to open said valve, an index on which the gas purchased is indicated, a hand for said index, a cam plate connected with said hand for actuating the same and being mounted to turn on the arc of a circle and having an oblique slot, and a pin carried by said stem in said slot for acting against said cam during the travel of said stem; substantially as set forth.

11. A meter, a valve for controlling the flow of gas through the same, a worm and stem adapted to have a longitudinal movement to control the position of said valve, mechanism coöperating with the passage of gas from the meter for effecting the travel of said worm and stem toward the initial position, means for manually effecting the reverse travel of said worm and stem for opening said valve, and means operable by the movement of said stem for locking said worm and stem against further actuation in one direction after having been moved to the full extent intended for the capacity of the apparatus; substantially as set forth.

Signed at New York city, in the county of New York and State of New York this 25th day of July A. D. 1906.

NILS D. NELSON.

Witnesses:
CHAS. C. GILL,
ARTHUR MARION.